United States Patent

Palmer

[15] 3,647,368

[45] Mar. 7, 1972

[54] USE OF SODIUM CHLORIDE IN PROVIDING AQUEOUS SOLUTIONS OF COPPER SALTS FROM COPPER ORE

[72] Inventor: Jay W. Palmer, Crystal Lake, Ill.
[73] Assignee: Morton-Norwich Products, Inc., Chicago, Ill.
[22] Filed: Apr. 9, 1970
[21] Appl. No.: 27,060

[52] U.S. Cl. .................................23/97, 23/55, 23/89, 75/117
[51] Int. Cl. ....................................................C01g 3/04
[58] Field of Search .................23/97, 55, 89, 154; 75/117

[56] References Cited

UNITED STATES PATENTS

| 1,111,874 | 9/1914 | Vadner | 75/117 |
| 1,553,223 | 9/1925 | Dietzsch | 23/97 |
| 227,902 | 5/1880 | Hunt et al. | 23/97 |
| 1,207,243 | 12/1916 | Vadner | 23/97 |
| 903,732 | 11/1908 | Laist | 23/97 |
| 1,319,858 | 10/1919 | Edwards | 23/97 X |
| 1,679,294 | 7/1928 | Dietzch | 75/117 |

Primary Examiner—Edward Stern
Attorney—Jack Axelrood

[57] ABSTRACT

A process for preparing aqueous solutions of copper salts from low-grade copper ores by admixing the ore with sodium chloride, roasting the ore-sodium chloride admixture at an elevated temperature, extracting the roasted admixture with a leaching solution saturated with respect to sulfur dioxide and containing sodium chloride, and separating therefrom an aqueous solution containing a soluble copper salt. The solution of copper salt so prepared is suitable for further chemical processing to prepare a variety of copper salts or pure copper metal.

8 Claims, 3 Drawing Figures

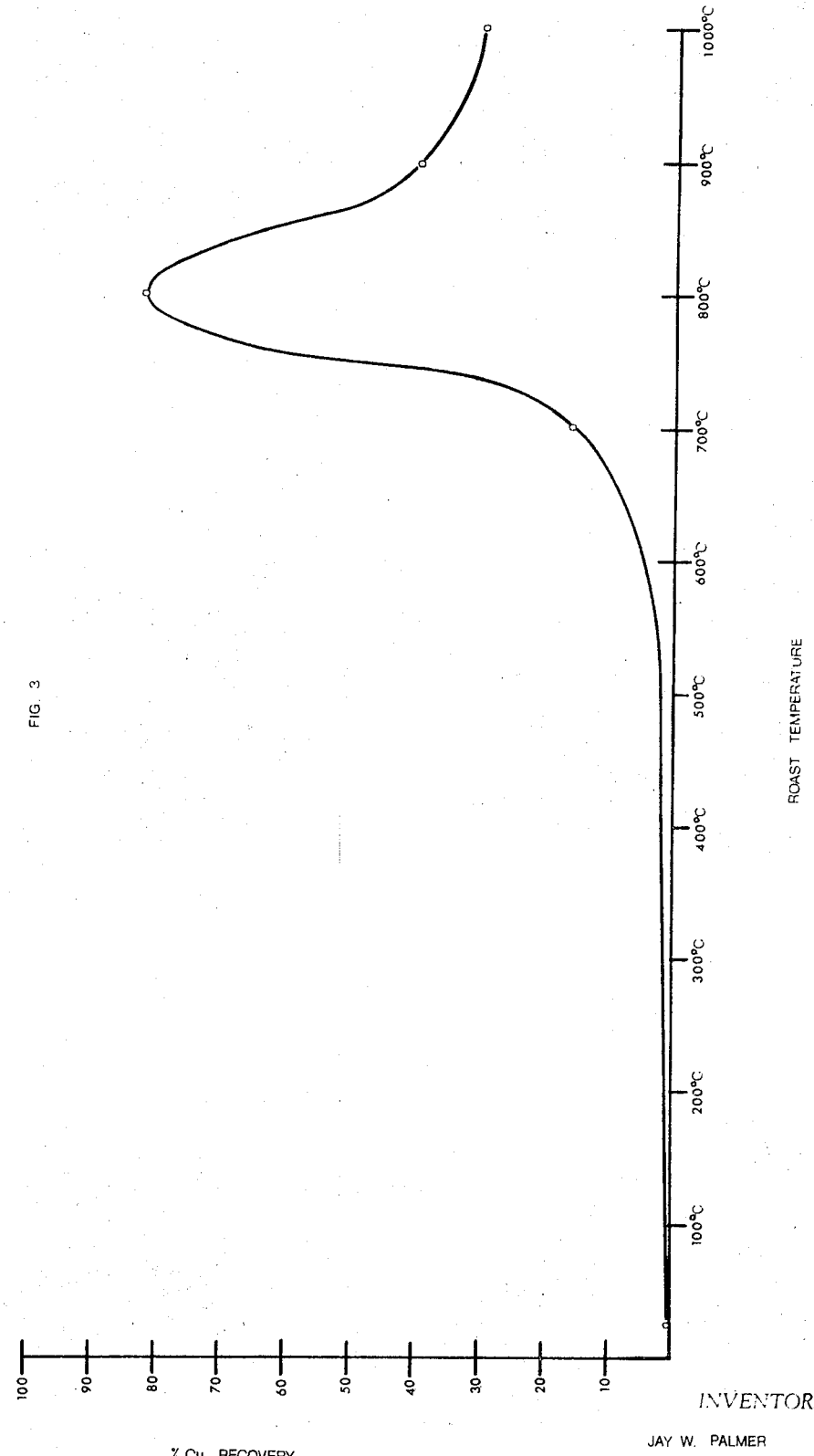

USE OF SODIUM CHLORIDE IN PROVIDING AQUEOUS SOLUTIONS OF COPPER SALTS FROM COPPER ORE

BACKGROUND OF THE INVENTION

1. Field of the Invention

In view of the constant depletion of sources of high-grade copper ore deposits, there is a continuing need in a complex industrial society for the development of efficient and economical methods for the extraction of copper from low-grade ores. The unique electrical and thermal conductivities of copper metal and its excellent corrosion resistance, coupled with the wide range of uses of copper salts in medicine, metallurgy, dyeing, disinfecting, and in the chemical industry in general, dictate that the supply of this important metal be assured.

2. Description of the Prior Art

In the United States, about 94 percent of the copper produced is the result of a process which comprises mining, concentrating, smelting, refining, and fabricating. In a concentrating operation, the process usually comprises classification of the finely pulverized ore, flotation, and dewatering to produce a concentrate having a copper content from about 15 to about 30 percent. This type of operation requires the use of expensive equipment such as a series of grinders and ball mills, classifiers, thickeners, and flotation equipment.

Approximately 4 percent of U.S. copper is produced by leaching ores directly with a variety of solvents, the most commonly used solvent being sulfuric acid in a 5–10 percent solution. The remaining 2 percent of copper production is carried out by direct smelting of ores without concentrating. The wet treatment (or leaching) methods for the recovery of copper offer certain advantages over the concentrating and smelting processes. For example, the need for furnaces and large quantities of expensive fuel and fluxes is eliminated. In addition, also eliminated are dust and fumes generated in the smelting processes which are a major source of air pollution in the industrial production of copper.

Conventional leaching processes make use of sulfuric acid which is a corrosive substance and leads to problems in handling with respect to the corrosion and subsequent deterioration of equipment and the danger to personnel. Further, where the copper ore contains appreciable quantities of limestone, an excessive proportion of the sulfuric acid is used up in reaction with this substance with the result that increased quantities of the acid are required, thereby impairing the economics of the process.

Roasting of copper ores with salt (sodium chloride) to produce copper chloride has been practiced since the 16th century. One such process is the conversion of copper-bearing pyrites to soluble copper chlorides with the subsequent extraction of the chloride with either hot water of dilute hydrochloric acid. This and other sodium chloride roasting methods, through operable, have been found to be inefficient and therefore commercially unacceptable. Other copper ore beneficiating processes utilize chlorine which reacts readily with copper ores to provide complete chlorination in 45 minutes at 250° C. Dilute hydrochloric acid or ammonia is used to leach the chlorinated ores and obtain copper solutions. The disadvantages of these methods lies in the use of chlorine gas which is exceedingly corrosive, dangerous to handle and expensive.

Accordingly, it would be desirable to provide a process for the extraction of copper from low grade copper ores which overcomes the aforenoted disadvantages. It is therefore an object of the present invention to provide a simplified process for the preparation of aqueous solutions of copper salts from low grade copper ores, which process obviates the use of the usual concentrating and flotation equipment.

It is another object of this invention to provide a simplified process for the preparation of aqueous solutions of copper salts from low-grade copper ores, which process eliminates the use of sulfuric acid as a leaching agent. It is still another object of this invention to provide a simplified process for the preparation of copper salts from low grade copper ores, which process eliminates the use of chlorine as a copper chlorinating agent. It is a further object of this invention to provide a more efficient salt roasting process for the recovery of copper from low-grade copper ores.

The fulfillment of these and other related objects of this invention may be more readily appreciated by reference to the following specification, examples, and appended claims.

SUMMARY OF THE INVENTION

Broadly, the process of the present invention provides an aqueous solution of a copper salt from a copper bearing ore by a process which comprises admixing sodium chloride with said ore and roasting (heating) the resultant mixture at a temperature of from about 700° C. to about 1,000° C., contacting said roasted admixture with an aqueous leaching solution to form a slurry, said leaching solution being substantially saturated with respect to sulfur dioxide and containing at least about 5 grams of sodium chloride per 100 ml. of solution, and separating from said slurry an aqueous solution containing a soluble copper salt.

The present process is applicable to all types of copper ores, including the sulfide and oxide types, and particularly to low-grade ores which are here taken to mean those ores which have as little as about 0.5% copper content. The copper ores generally available in many North American mines contain the igneous mineral monzonite porphyry together with dolomitic and high calcium limestone in admixture with a variety of copper bearing minerals, typified by chalcopyrite, a sulfide type copper compound represented by the formula $CuFeS_2$. The present process is also operable for those copper ores in which other igneous minerals such as for example granite, diorite, rhyolite, andesite, and felsite are present instead of monzonite porphyry, and where clays such as bentonite and kaolinite, for example, and lime are present in the ore.

As hereinafter more fully demonstrated in the examples, the inclusion of sodium chloride in admixture with the ore prior to roasting is an important step in the process of the present invention. The addition of sodium chloride to the ore before roasting the resultant mixture in air is effective in converting the copper to a more available form (copper chloride) for subsequent extraction by the aqueous leaching solution of the present process. The effectiveness of this conversion is enhanced when the copper ore-sodium chloride admixtures contain from about 5 to about 25 weight percent of sodium chloride. When concentrations of sodium chloride exceed about 25 percent, the ore tends to sinter and some copper is lost to the vessel in which the roasting is carried out, thereby decreasing the yield of copper. If no sodium chloride is employed in admixture with the copper ore, then the recovery of copper is markedly decreased. A preferred concentration of sodium chloride is from about 10 to about 25 weight percent. A most preferred concentration of sodium chloride is from about 12 to about 23 weight percent of the sodium chloride-ore admixture.

The roasting temperature of the ore-sodium chloride admixture may range from about 700° C. to about 1,000° C. A preferred temperature range is from about 750° C. to about 850° C. The length of time that the ore-sodium chloride admixture is maintained at the roasting temperature may be as little as one-half hour. Substantially complete conversion of copper to copper chloride occurs with a roasting time of about 1 hour. Roasting times in excess of 1 hour do not materially increase the subsequent recovery of copper.

The leaching solution contains both sodium chloride and sulfur dioxide. As is more fully illustrated in the examples, the recovery of copper is significantly decreased when either of these two substances is omitted from the leaching solution. The concentration of sodium chloride may be as low as about 5 grams per 100 ml. of solution. It is preferred that the concentration of sodium chloride be at least about 10 grams per 100 ml. of leaching solution. Although concentration in excess of 10 grams per 100 ml. are operable, it is not necessary to use greater concentrations since commensurately increased recoveries of copper are not obtained. The leaching solution is saturated with respect to sulfur dioxide. This is conveniently accomplished by constantly bubbling sulfur dioxide from a cylinder of $SO_2$ through the solution. If desired, the $SO_2$ formed in the roasting step may be utilized in the preparation of the leaching solution thereby preventing this pollutant from escaping into the air. Very little copper is extracted from the roasted ore-sodium chloride admixture if sulfur dioxide is not present in the leaching solution. The overall reaction in the leaching step may be represented by the following chemical equation:

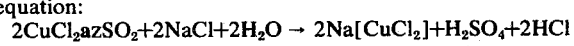
$$2CuCl_2 \cdot azSO_2 + 2NaCl + 2H_2O \rightarrow 2Na[CuCl_2] + H_2SO_4 + 2HCl$$

The sulfuric and hydrochloric acids formed are, for the most part, neutralized by the limestone constituent of the ore, thus substantially eliminating a troublesome disposal problem.

Leaching of the roasted ore-sodium chloride admixture may be carried out at ambient temperatures. However, it is preferred that the leaching solution be maintained at an elevated temperature in the range of from about 90° to about 100° C. and that at this temperature the leaching be continued for at least about 1 hour.

In one preferred form, the process of this invention comprises:

I. admixing sodium chloride with a copper-bearing ore to form a mixture containing from about 5 to about 25 weight percent of sodium chloride and roasting the resultant mixture at a temperature from about 750° C. to about 850° C. for at least about one-half hour;

II. contacting said roasted mixture with an aqueous leaching solution to form a slurry, said leaching solution being at an elevated temperature and substantially saturated with respect to sulfur dioxide and containing at least 5 grams of sodium chloride per 100 ml. of solution; and III. filtering from said slurry an aqueous solution containing a soluble copper salt.

For a more complete understanding of the present invention, reference is now made to the following specific examples illustrating the novel process of this invention.

DESCRIPTION OF THE PREFERRED EMBODIMENTS

EXAMPLE 1

Copper Ore

Figure 1:
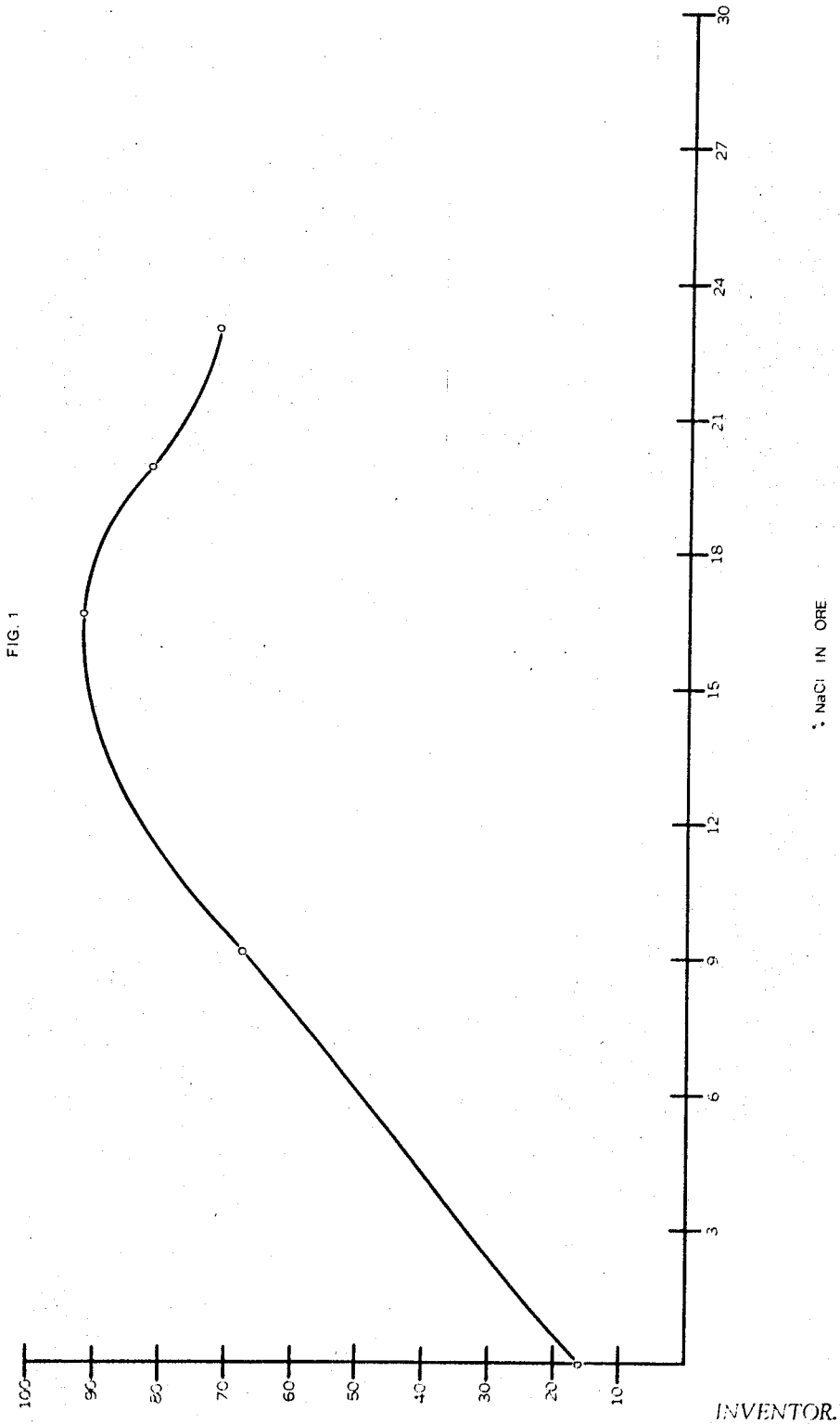

A synthetic copper ore was prepared to simulate a typical low-grade copper ore which is found in the United States. This was done by admixing 5.0 g. of monzonite porphyry, 4.8 g. of dolomitic limestone and 0.2 g. chalcopyrite (25.0% Cu content) to yield 10.0 g. of ore containing 0.05 g. Cu.

Procedure

This ore (10.0 g.) was thoroughly admixed with 2.5 g. NaCl to form a homogenous mixture containing 20 percent by weight of sodium chloride. This mixture was then roasted (calcined) at 800° C. for approximately 1 hour. The roasted mixture was allowed to cool and was then added to 100 ml. of an aqueous leach solution saturated with respect to sulfur dioxide and containing 10 g. NaCl. Sulfur dioxide saturation of the leach solution was maintained by constantly bubbling $SO_2$ gas therethrough. The temperature of the leach solution was maintained at about 90° C. The mass was filtered after a contact time between the calcined ore and the leach solution of about 1 hour. The filtrate was analyzed for copper content and found to contain 0.041 g. Cu.

Recovery of Cu = (0.041 × 100)/0.05 = 82.0%

EXAMPLE 2

The procedure of Example 1 was repeated with the exception that no sodium chloride was admixed with the ore prior to roasting. Upon analysis, the filtrate was found to contain 0.0082 g. Cu.

Recovery of Cu = (0.0082 × 100)/0.05 = 16.4%

Comparing the results of Example 2 with that of Example 1, it is evident that the lack of sodium chloride in admixture with the ore prior to roasting results in a vastly decreased recovery of copper.

EXAMPLE 3

The procedure of Example 1 was repeated with the exception that only 1.0 g. of sodium chloride was admixed with the ore prior to roasting to form a mixture containing 9.1 percent by weight of sodium chloride. Upon analysis, the filtrate was found to contain 0.034 g. Cu.

Recovery of Cu = (0.034 × 100)/0.05 = 68.0%

EXAMPLE 4

The procedure of Example 1 was repeated with the exception that only 2.0 g. NaCl was admixed with the ore prior to roasting to form a mixture containing 16.7 percent by weight of sodium chloride. Upon analysis, the filtrate was found to contain 0.046 g. Cu.

Recovery of Cu = (0.046 × 100)/0.05 = 92.0%

EXAMPLE 5

The procedure of Example 1 was repeated with the exception that 3.0 g. NaCl were admixed with the ore prior to roasting to form a mixture containing 23.1 percent by weight of sodium chloride. Upon analysis, the filtrate was found to contain 0.036 g. Cu.

Recovery of Cu = (0.036 × 100)/0.05 = 72.0%

The respective quantities of sodium chloride used and of copper recovered in Examples 1-5 are summarized in Table 1.

TABLE 1

| Example | 1 | 2 | 3 | 4 | 5 |
| --- | --- | --- | --- | --- | --- |
| NaCl in admixture with ore | 2.5 | 0 | 1.0 | 2.0 | 3.0 |
| % NaCl in admixture with ore | 20 | 0 | 9.1 | 16.7 | 23.1 |
| % Recovery of copper | 82.0 | 16.4 | 68.0 | 92.0 | 72.0 |

Examples 1 through 5 illustrate that in the process of the present invention increased recoveries of copper are obtained when sodium chloride is admixed with the ore prior to roasting. This is depicted graphically in FIG. 1 where the percent recovery of copper obtained in Examples 1-5 is plotted along the ordinate and the percent of sodium chloride in the ore mixture is plotted along the abscissa.

EXAMPLE 6

The procedure of Example 1 was repeated except that the contact time between the calcined ore and the leach solution was 3 hours. After filtration, the filtrate was analyzed and found to contain 0.048 g. Cu.

Recovery of Cu = (0.048 × 100)/0.05 = 96.0%

EXAMPLE 7

The procedure of Example 1 was repeated except that the leach solution contained no sulfur dioxide. Upon analysis, the filtrate was found to contain 0.00004 g. Cu.

Recovery of Cu = (0.00004 × 100)/0.05 = 0.08%

A comparison of the copper recovery of Example 7 with the recoveries of Examples 1, 3, 4, 5, and 6 underscores the necessity of the presence of sulfur dioxide in the leach solution.

EXAMPLE 8

The procedure of Example 1 was repeated with the exception that the leach solution contained no sodium chloride. Upon analysis, the filtrate was found to contain 0.0055 g. Cu.

Recovery of Cu = (0.0055 × 100)/0.05=11.0%

EXAMPLE 9

The procedure of Example 1 was repeated with the exception that the leach solution contained 5.0 g. sodium chloride. Upon analysis, the filtrate was found to contain 0.0095 g. Cu.

Recovery of Cu = (0.0095 × 100)/0.05=19.0%

Figure 2:
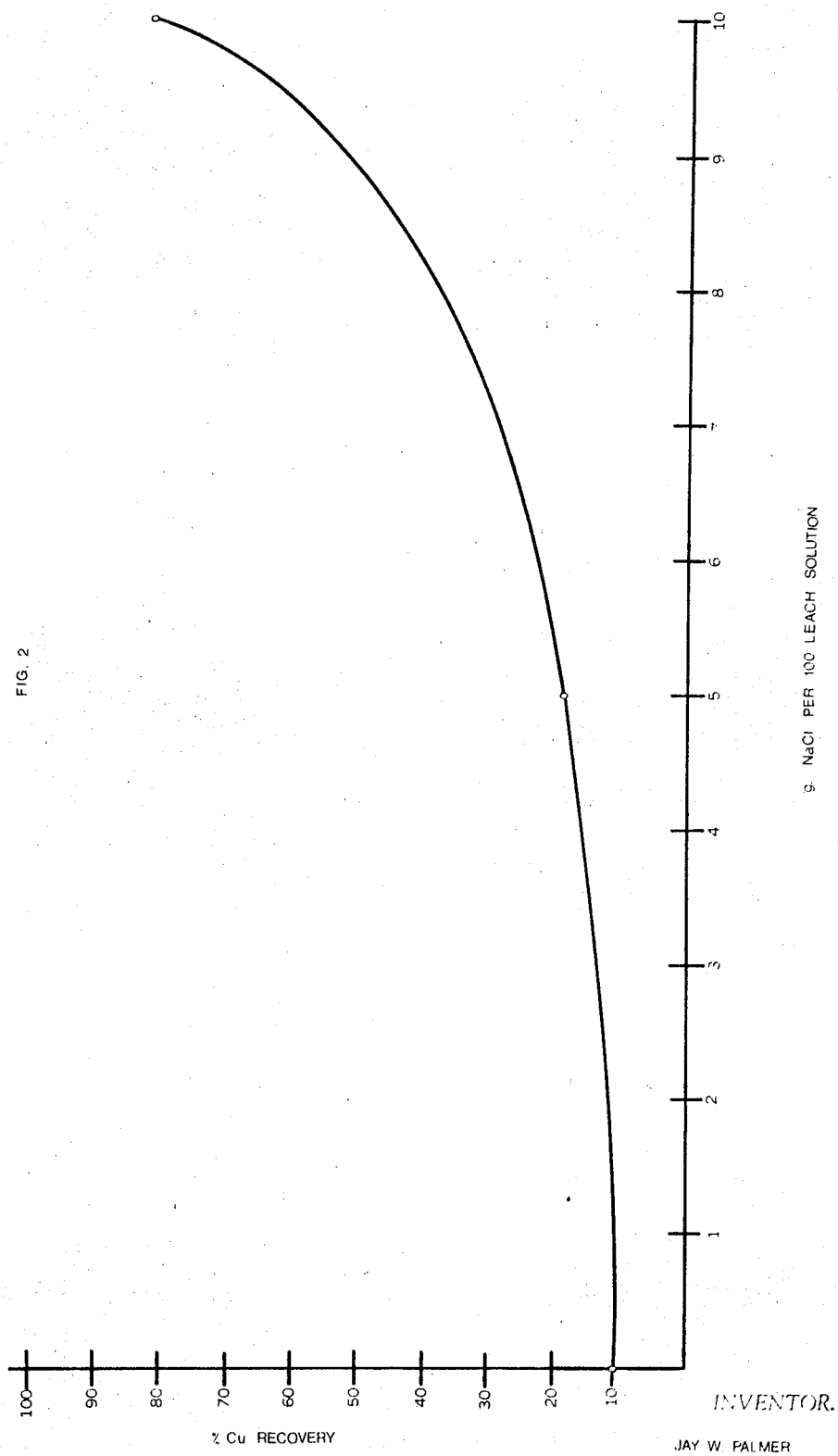

Examples 1, 8, and 9 illustrate that in the process of the present invention increased recoveries of copper are obtained when at least about 5 grams of sodium chloride are present in the leach solution used to extract copper from the roasted ore mixture. This is depicted graphically in FIG. 2 where the percent recovery of copper obtained in Examples 1, 8, and 9 is plotted along the ordinate and the number of grams of sodium chloride per 100 ml. of each solution is plotted along the abscissa.

EXAMPLE 10

The procedure of Example 1 was repeated with the exception that the ore and sodium chloride were admixed at ambient temperature (75° F.) and the admixture was not subjected to roasting (calcining). Upon analysis, the filtrate was found to contain 0.00006 g. Cu.

Recovery of Cu = (0.00006 × 100)/0.05=0.12%

EXAMPLE 11

The procedure of Example 1 was repeated with the exception that the roast temperature was 700° C. Upon analysis, the filtrate was found to contain 0.0008 g. Cu.

Recovery of Cu = (0.008 × 100)/0.05=16.0%

EXAMPLE 12

The procedure of Example 1 was repeated with the exception that the roast temperature was 900° C. Upon analysis, the filtrate was found to contain 0.02 g. Cu.

Recovery of Cu = (0.02 × 100)/0.05=40.0%

EXAMPLE 13

The procedure of Example 1 was repeated with the exception that the roast temperature was 1,000° C. Upon analysis, the filtrate was found to contain 0.015 g. Cu.

Recovery of Cu = (0.015 × 100)/0.05=30.0%

The respective copper recoveries in Examples 1, 10, 11, 12, and 13 are set forth in Table 2.

TABLE 2

| Example | Roast Temperature | % Cu Recovered |
| --- | --- | --- |
| 1 | 800° C. | 82.0 |
| 10 | 75° F. (24° C.) | 0.12 |
| 11 | 700° C. | 16.0 |
| 12 | 900° C. | 40.0 |
| 13 | 1000° C. | 30.0 |

Examples 1, 10, 11, 12, and 13 illustrate that in the process of the present invention roasting (i.e., calcining) the ore-salt admixture at an elevated temperature is an essential step in the process and that a roasting temperature in the neighborhood of about 800° C. provides maximum copper recovery. This is depicted graphically in FIG. 3 where the percent recovery of copper is plotted along the ordinate and the temperature of roasting is plotted along the abscissa.

EXAMPLE 14

The procedure of Example 1 was repeated with the exception that the duration of roasting at 800° C. was one-half hour rather than 1 hour. Upon analysis, the filtrate was found to contain 0.033 g. Cu.

Recovery of Cu = (0.033 × 100)/0.05=66.0%

EXAMPLE 15

The procedure of Example 1 was repeated with the exception that the duration of roasting at 800° C. was for 3 hours rather than 1 hour. Upon analysis, the filtrate was found to contain 0.042 g. Cu.

Recovery of Cu = (0.042 × 100)/0.05=84.0%

Comparing the results of Examples 1, 14, and 15, it is seen that the recovery of copper is virtually independent of the length of time that the ore-salt admixture is roasted since a roast time as short as one-half hour is virtually sufficient to effect conversion of the copper in the ore to copper chloride and provide adequate recovery of copper. A roast time in excess of about 1 or 2 hours does not materially increase the recovery of copper.

EXAMPLE 16

The procedure of Example 1 was repeated with the exception that the quantity of dolomitic limestone employed was 3.0 g. and the quantity of NaCl used in admixture with the ore prior to roasting was 3.0 g. Upon analysis, the filtrate was found to contain 0.040 g. Cu.

Recovery of Cu = (0.040 × 100)/0.05=80.0%

EXAMPLE 17

The procedure of Example 1 was repeated with the exception that the quantity of dolomitic limestone employed was 1.0 g. and the quantity of NaCl used in admixture with the ore prior to roasting was 3.0 g. Upon analysis, the filtrate was found to contain 0.020 g. Cu.

Recovery of Cu = (0.020 × 100)/0.05=40.0%

EXAMPLE 18

The procedure of Example 1 was repeated with the exception that the quantities of monzonite porphyry and of dolomitic limestone were each 3.0 g., and the quantity of NaCl used in admixture with the ore was 3.0 g. Upon analysis, the filtrate was found to contain 0.037 g. Cu.

Recovery of Cu = (0.037 × 100)/0.05=74.0%

EXAMPLE 19

The procedure of Example 1 was repeated with the exception that the quantities of monzonite porphyry and of dolomitic limestone were each 1.0 g. and the quantity of NaCl used in admixture with the ore prior to roasting was 3.0 g. Upon analysis, the filtrate was found to contain 0.031 g. Cu.

Recovery of Cu = (0.031 × 100)/0.05=62.0%

EXAMPLE 20

The procedure of Example 1 was repeated with the exception that the quantity of monzonite porphyry was 1.0 g. and the quantity of dolomitic limestone was 5.0 g. The quantity of NaCl in admixture with the ore prior to roasting was 3.0 g. Upon analysis, the filtrate was found to contain 0.031 g. Cu.

Recovery of Cu = (0.031 × 100)/0.05=62.0%

EXAMPLE 21

The procedure of Example 1 was repeated with the exception that the quantity of monzonite porphyry was 3.0 g. and the quantity of dolomitic limestone was 5.0 g. The quantity of NaCl in admixture with the ore prior to roasting was 3.0 g. Upon analysis, the filtrate was found to contain 0.038 g. Cu Recovery of Cu = (0.038 × 100)/0.05=76.0%

EXAMPLE 22

The procedure of Example 1 was repeated with the exception that 5.0 g. of calcium carbonate were substituted for the dolomitic limestone. The quantity of NaCl in admixture with the ore prior to roasting was 3.0 g. Upon analysis, the filtrate was found to contain 0.050 g. Cu.

Recovery of Cu = (0.050 × 100)/0.05=100.0%

EXAMPLE 23

The procedure of Example 1 was repeated with the exception that 5.0 g. of calcium hydroxide were substituted for the dolomitic limestone. The quantity of NaCl in admixture with the ore prior to roasting was 3.0 g. Upon analysis, the filtrate was found to contain 0.026 g. Cu.

Recovery of Cu = (0.026 × 100)/0.05=54.0%

EXAMPLE 24

The procedure of Example 1 was repeated with the exception that 5.0 g. of calcium chloride were substituted for the dolomitic limestone. The quantity of NaCl in admixture with the ore prior to roasting was 3.0 g. Upon analysis, the filtrate was found to contain 0.041 g. Cu.

Recovery of Cu = (0.041 × 100)/0.05=82.0%

EXAMPLE 25

The procedure of Example 1 was repeated with the exception that no dolomitic limestone was employed. Upon analysis, the filtrate was found to contain 0.013 g. Cu.

Recovery of Cu = (0.013 × 100)/0.05=26.0%

EXAMPLE 26

The procedure of Example 1 was repeated with the exception that no monzonite porphyry was used. Upon analysis, the filtrate was found to contain 0.030 g. Cu.

Recovery of Cu = (0.030 × 100)/0.05=60.0%

The results of Examples 1 and 16 through 26 are summarized in Table 3. These examples demonstrate that the process is operable when the copper-bearing constituent, e.g., chalcopyrite, is present in a matrix comprising a variety of minerals in a variety of proportions, although the proportion of copper recovered is less when the ore matrix does not contain a calcium compound constituent (See Example 25). Where the ore, as determined by prior analysis, does not contain an acid acceptor such as a calcium compound, then it is advisable to add such substance to the ore to improve the yield of copper obtained.

What is claimed is:

1. A process for providing an aqueous solution of a copper salt from a copper-bearing ore, comprising:
    I. admixing sodium chloride with said ore to form a mixture containing from about 5 to about 25 weight percent of sodium chloride and roasting the resultant mixture at a temperature of from about 700° C. to about 1,000° C.;
    II. contacting said roasted mixture with an aqueous leaching solution to form a slurry, said leaching solution being substantially saturated with respect to sulfur dioxide and containing at least about 5 grams of sodium chloride per 100 ml. of solution, said leaching solution functioning to extract copper in the cupric state from said roasted mixture; and
    III. separating from said slurry an aqueous solution containing a soluble copper salt.

2. The process of claim 1 wherein the leaching solution contains at least about 7 grams of sodium chloride per 100 ml. of solution.

3. The process of claim 1 wherein the time of roasting is at least about one-half hour.

4. The process of claim 1 wherein the roasting temperature is from about 750° C. to about 850° C.

5. The process of claim 1 wherein the admixture of copper ore and sodium chloride contains from about 10 to about 25 weight percent of sodium chloride.

6. The process of claim 1 wherein the temperature of the leaching solution is at least about 90° C.

7. A process for providing an aqueous solution of a copper salt from a copper-bearing ore, comprising:
    I. admixing sodium chloride with said ore to form a mixture containing about 5 to 25 weight percent of sodium chloride and roasting the resultant mixture at a temperature from about 750° C. to about 850° C. for at least about one-half hour;
    II. contacting said roasted mixture with an aqueous leaching solution to form a slurry, said leaching solution being at an elevated temperature and substantially saturated with respect to sulfur dioxide and containing at least about 5 grams of sodium chloride per 100 ml. of solution, said leaching solution functioning to extract copper in the cupric state from said roasted mixture; and
    III. filtering from said slurry an aqueous solution containing a soluble copper salt.

8. The procedure of claim 7 wherein the concentration of sodium chloride in admixture with the ore is from about 12 to about 23 weight percent, the concentration of sodium chloride in the leaching solution is at least about 10 grams per 100 ml. of solution, and the temperature of the leaching solution is at least about 90° C.

TABLE 3

| Example | 1 | 16 | 17 | 18 | 19 | 20 | 21 | 22 | 23 | 24 | 25 | 26 |
|---|---|---|---|---|---|---|---|---|---|---|---|---|
| Ore constituents: | | | | | | | | | | | | |
| Monzonite porphyry: | | | | | | | | | | | | |
| Wt. (g.) | 5.0 | 5.0 | 5.0 | 3.0 | 1.0 | 1.0 | 3.0 | 5.0 | 5.0 | 5.0 | 5.0 | |
| Percent | 50.0 | 61.0 | 80.6 | 48.4 | 45.4 | 16.1 | 36.6 | 49.0 | 49.0 | 49.0 | 96.1 | |
| Dolomitic limestone: | | | | | | | | | | | | |
| Wt. (g.) | 4.8 | 3.0 | 1.0 | 3.0 | 1.0 | 5.0 | 5.0 | | | | | 5.0 |
| Percent | 48.0 | 36.6 | 16.1 | 48.4 | 45.4 | 80.6 | 61.0 | | | | | 96.1 |
| Chalcopyrite: | | | | | | | | | | | | |
| Wt. (g.) | 0.2 | 0.2 | 0.2 | 0.2 | 0.2 | 0.2 | 0.2 | 0.2 | 0.2 | 0.2 | 0.2 | 0.2 |
| Percent | 2.0 | 2.4 | 3.3 | 3.2 | 9.2 | 3.3 | 2.4 | 2.0 | 2.0 | 2.0 | 3.9 | 3.9 |
| Calcium carbonate: | | | | | | | | | | | | |
| Wt. (g.) | | | | | | | | 5.0 | | | | |
| Percent | | | | | | | | 49.0 | | | | |
| Calcium hydroxide: | | | | | | | | | | | | |
| Wt. (g.) | | | | | | | | | 5.0 | | | |
| Percent | | | | | | | | | 49.0 | | | |
| Calcium chloride: | | | | | | | | | | | | |
| Wt. (g.) | | | | | | | | | | 5.0 | | |
| Percent | | | | | | | | | | 49.0 | | |
| Percent Cu recovery | 82.0 | 80.0 | 40.0 | 74.0 | 62.0 | 62.0 | 76.0 | 100.0 | 54.0 | 82.0 | 26.0 | 60.0 |

UNITED STATES PATENT OFFICE
CERTIFICATE OF CORRECTION

Patent No. 3,647,368      Dated March 7, 1972

Inventor(s) JAY W. PALMER

It is certified that error appears in the above-identified patent and that said Letters Patent are hereby corrected as shown below:

Column 3, line 15, "az" should be -- + --

Column 4, line 44, the letter "g." should precede the symbol "NaCl"

Signed and sealed this 8th day of August 1972.

(SEAL)
Attest:

EDWARD M. FLETCHER, JR.
Attesting Officer

ROBERT GOTTSCHALK
Commissioner of Patents